United States Patent [19]
Willetts

[11] 3,895,819
[45] July 22, 1975

[54] SINGLE AXLE SUSPENSION SYSTEM

[76] Inventor: Elwood H. Willetts, 102 S. Penataquit Ave., Bay Shore, N.Y. 11706

[22] Filed: May 2, 1973

[21] Appl. No.: 356,496

Related U.S. Application Data

[63] Continuation-in-part of Ser. No. 293,648, Sept. 29, 1972, abandoned, and Ser. No. 196,982, Nov. 9, 1971, Pat. No. 3,767,222.

[52] U.S. Cl........ 280/124 R; 267/21 A; 267/57.1 A
[51] Int. Cl............................................. B60g 11/22
[58] Field of Search.......... 267/571 A, 571 R, 63 R, 267/63 A, 21 R, 21 A; 280/124 R, 124 A

[56] References Cited
UNITED STATES PATENTS

| | | | |
|---|---|---|---|
| 1,114,284 | 10/1914 | Olsen | 267/21 |
| 1,710,809 | 4/1929 | Broadwell | 267/57.1 R |
| 1,932,445 | 10/1933 | Burns | 267/57.1 A |
| 2,553,188 | 5/1951 | Grube | 267/21 A |
| 2,800,320 | 7/1957 | Jarret | 267/21 |
| 3,332,701 | 7/1967 | Masser | 280/124 R |
| 3,687,478 | 8/1972 | Willetts | 267/63 R |

Primary Examiner—Philip Goodman
Attorney, Agent, or Firm—Paul J. Sutton

[57] ABSTRACT

The present invention comprises a suspension system for multiple axle vehicles, and more specifically, a single axle suspension structure wherein road and tire excitations of an axle, such as a front axle, are isolated from the sprung mass or vehicle frame. This single axle suspension structure employs a pressure resistant, spring means providing an operationally progressive increase in pounds of spring resistance per inch of wheel stroke which may employ an arcuately engaged (1) a spherical elastomer arcuately engaged between opposing seats of predetermined spherical radii, (2) volute springs, and (3) conical helical springs.

11 Claims, 6 Drawing Figures

PATENTED JUL 22 1975　　　　　3,895,819

SHEET　　4

SINGLE AXLE SUSPENSION SYSTEM

This is a continuation-in-part patent application of my co-pending applications Ser. Nos. 293,648 filed Sept. 29, 1972 now abandoned and 196,982 filed Nov. 9, 1971, now U.S. Pat. No. 3,767,222 which have been co-pending with my application Ser. No. 123,581, filed Mar. 12, 1971, now U.S. Pat. No. 3,687,478 dated Aug. 29, 1972, and further discloses improvements over the subject matter contained in my U.S. Pat. No. 3,572,745 dated Mar. 30, 1971. U.S. Pat. No. 3,572,745, itself, is a continuation-in-part of application Ser. No. 721,558, filed Apr. 1, 1968, now abandoned, and application Ser. No. 649,502, filed June 28, 1967, now abandoned. The subject matter of my U.S. Pat. Nos. 3,572,745 and 3,687,478 is hereby incorporated by reference into the present disclosure.

My present invention relates generally to suspension structures of the type used with multiple axle bogies of trucks, trailers and railroad cars, and more specifically, this invention relates to composite, elastomerically damped suspension structures capable of use with both single and tandem axle vehicles which exhibit a novel, progressively increasing spring rate under and when subjected to increasing loads.

The progression of my efforts in attempting to effectively isolate road-induced excitations from the driver of vehicles may perhaps best be seen by reviewing certain of my previously issued patents. In my U.S. Pat. No. 3,013,808, we see the concept of isolation of excitations within one axle from a sprung mass as well as from another axle of a tandem bogie. In U.S. Pat. No. 3,171,668 we see my use of a supporting bushing within which a relatively high radial deflection is exhibited, and wherein a tubular elastomer is highly deflected such that it is stressed in torsional shear.

In U.S. Pat. Nos. 3,337,235 and 3,484,118 I disclose embodiments of my inventions wherein a helical torsion spring is utilized to isolate excitations between axles and a sprung mass. U.S. Pat. No. 3,361,442 covers my articulated suspension beam for the support of opposing axles, in applications between the adjacent ends of pairs of leaf springs. The aforedescribed isolation is also accomplished by the structure shown in my U.S. Pat. No. 3,572,745.

The above patents, while non-anticipatory of the present invention, are brought to the reader's attention to shown the chronological development of structures which will yield favorable ride characteristics.

Perhaps a brief description of the operating characteristics of vehicle suspensions and their associated load levels will lend an appreciation of this subject matter to the reader. Generally, there are three categories of load levels: empty load level, design load level and bump load level. At empty load level, the weight of the vehicle is the mass on which the vehicle suspension system operates. At design load level, the suspension system operates on the mass of the vehicle plus the mass of the estimated full load of the vehicle. At bump load level, the suspension system operates on the same mass as at design load level mass with an additional static load induced by the design load level mass undergoing a change in direction of travel, as would be induced when, for example, a fully loaded vehicle encounters a sharp turn; or an additional dynamic load induced by encountering a road bump.

Since most vehicles generally operate in the three aforementioned modes, it would be advantageous to provide a suspension system which would cushion the vehicle ride by permitting only low frequency deflections in all three modes. In conventional vehicle suspension systems composed of a pair of rocker beams and a damping member between the vertically extending components of the rocker beams, when a dynamic force is induced on a loaded vehicle axle, i.e., when a bump load level condition occurs, the force is transmitted directly to the damping member which is already compressed by the static load on the vehicle. Since the damping member is usually designed so that it exhibits a high resistance to deflection or spring rate at design load level only, the damping member merely transmits the force back through the rocker beam and induces a resonance condition in the vehicle suspension system. This is unacceptable from the standpoint of vehicle suspension wear and comfort of ride. The same conditions result when a vehicle with a conventional suspension system and a damping member designed to provide a high spring rate at design load level only is in the empty load level mode. When the vehicle encounters a bump, there is virtually no deflection of the damping member resulting in a high frequency deflection ride during this mode of operation.

In order to provide a smooth, low frequency deflection ride during all three modes of operation, my U.S. Pat. No. 3,572,754 describes a suspension system wherein an elastomeric damping member having a cylindrical center section and spherically convex ends is positioned between a pair of spherically cupped discs or seats attached to the vertically extending components of a pair of opposing rocker beams. The combination of the concave seats and the spherically shaped elastomeric members provide a vehicle suspension system which exhibits a progressively increasing resistance to deflection, i.e., a progressively increasing spring rate.

A progressively increasing spring rate makes it possible for a suspension system to have a range of spring rates for different load levels. It is thus possible to have a low spring rate at an empty vehicle load level, a higher spring rate at design load level and a still higher spring rate at bump load level.

Accordingly, it is a primary object of the present invention to provide a single axle suspension structure having advantageous use with a front or steering axle of a multiple axle vehicle, in which a progressively increasing spring rate accompanies a wheel stroke of higher amplitude than is available with leaf springs.

It is accordingly a primary object of this invention to provide a vehicle suspension system having a progressively increasing resistance to deflection for a progressively increasing load.

It is a further object of this invention to provide a vehicle suspension system in which the spring rate varies over a greater range than in systems heretofore available.

It is a further object of this invention to provide a vehicle suspension system in which the spring rate increases from a lower magnitude at empty load levels to a greater magnitude at bump load levels than in systems heretofore available.

It is a further object of this invention to provide a vehicle suspension system which provides a low frequency deflection ride at empty load level and at design load level while providing a relatively higher rate at bump load level conditions.

It is a further object of this invention to provide a vehicle suspension system in which less elastomeric material is used to provide a progressively increasing spring rate than in systems heretofore available.

It is a further object of this invention to provide a vehicle suspension system having a progressively increasing spring rate in which the difference in spring mass deflection between empty and design load levels is less than in systems heretofore available.

Another object of this invention is to provide a vehicle suspension system having a spring rate which progressively exceeds the load increase on the suspension.

Still another object of this invention is to provide a suspension structure which exhausts relatively low vibrational frequency for an unladen vehicle, while also providing progressive resistance to transverse roll of the vehicle when loaded.

Yet a further object is to provide a progressively increasing suspension resistance in a single axle suspension for a steerable axle wherein the angle of axle king pin or caster remains constant throughout the load range of the suspension and/or throughout the range of brake torque reactions imposed on said steering axle.

It is a further object to accomplish the above objectives with a volute spring, or with a conical helical spring in lieu of the aforestated spherical elastomer.

The present invention fulfills the aforementioned objects and overcomes the limitations and disadvantages of prior art solutions to the aforementioned problems by providing, in a preferred embodiment of this invention, an elastomerically damped compression-resistant isolator in the form of a single axle suspension structure. A single axle suspension structure comprises a beam trunnioned at one end thereof and secured at its opposite end to a front or steering axle, for example, with a spherical compression-resistant elastomer, or a volute spring or a conical helical spring disposed there between. The elastomer is seated in a cupped spring seat attached to the beam, and its upward movement is resisted by a similar cupped or concave spring seat on which the vehicle frame is supported.

In this preferred embodiment of my invention the trunnion is bracketed at a corner of the vehicle frame, in the case where a steering axle is mounted thereunder, said trunnion being of adequate capacity to withstand the spring load reaction, as well as the brake torque, steering load, and transverse steering forces. A progressively increasing spring rate, combined with a higher deflection than is feasible with conventional leaf spring suspensions, affords a ready improvement in cab ride and reduced maintenance of chassis.

The invention will be more clearly understood from the following description of specific embodiments of my invention, together with the accompanying drawings, wherein similar reference characters denote similar elements throughout the several views, and in which.

Figure 1:
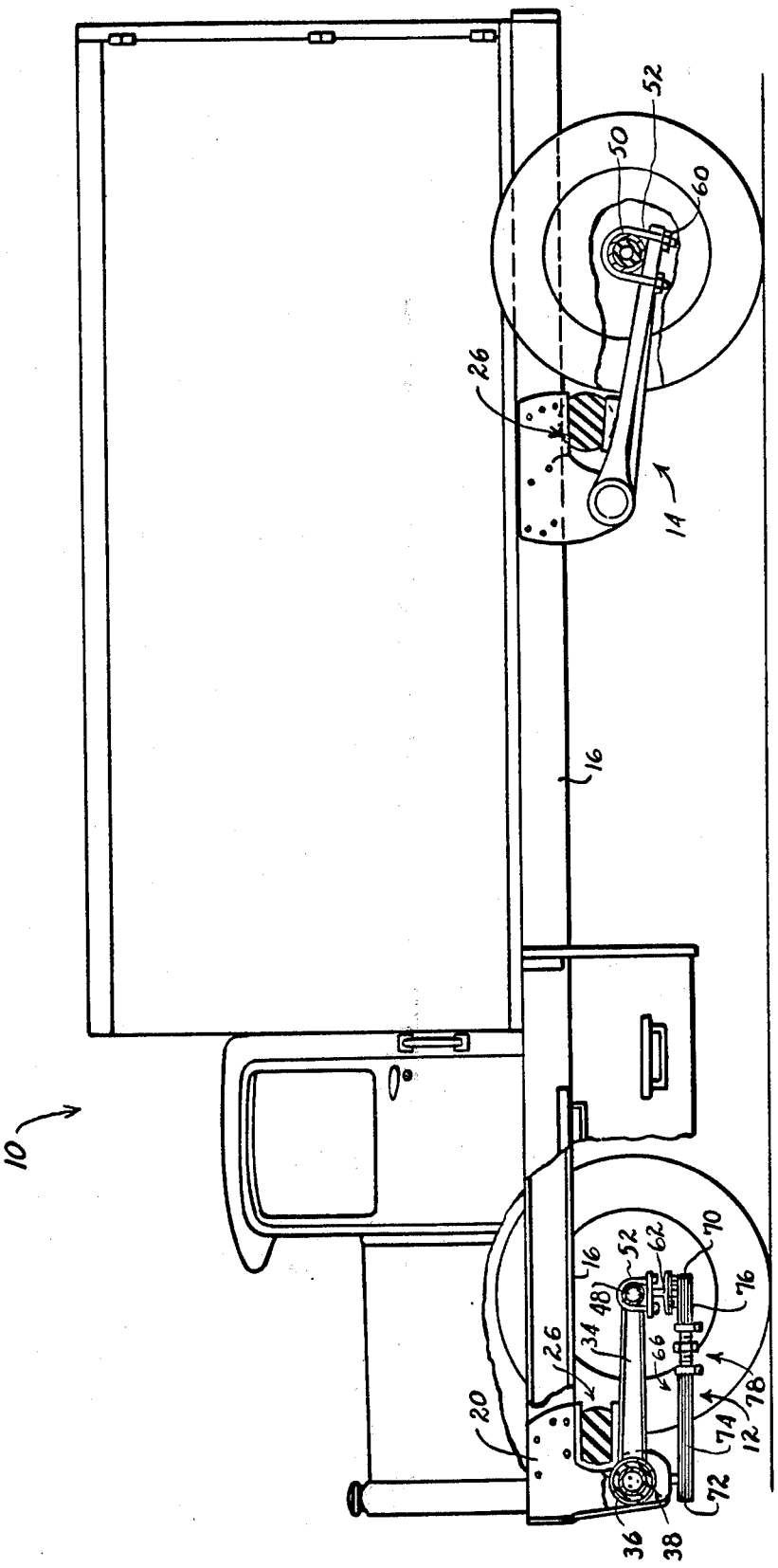
FIG. 1 is an elevational view of a truck which is equpped with independent front and rear axle suspension structures of the type provided by the present invention.

Referring now in more detail to the drawings, FIG. 1 illustrates a vehicle 10, such as a truck, which has been equipped with two single axle suspension systems, namely, front axle suspension system assembly 12 and a rear axle suspension system assembly 14. A vehicle frame 16 extends above assemblies 12 and 14 in a longitudinal direction with respect to the longitudinal axis of truck vehicle 10. Frame 16 terminates at its forwardmost end 18 at a depending over end bracket 20 which, in turn, extends downwardly from frame 16.

Figure 2:
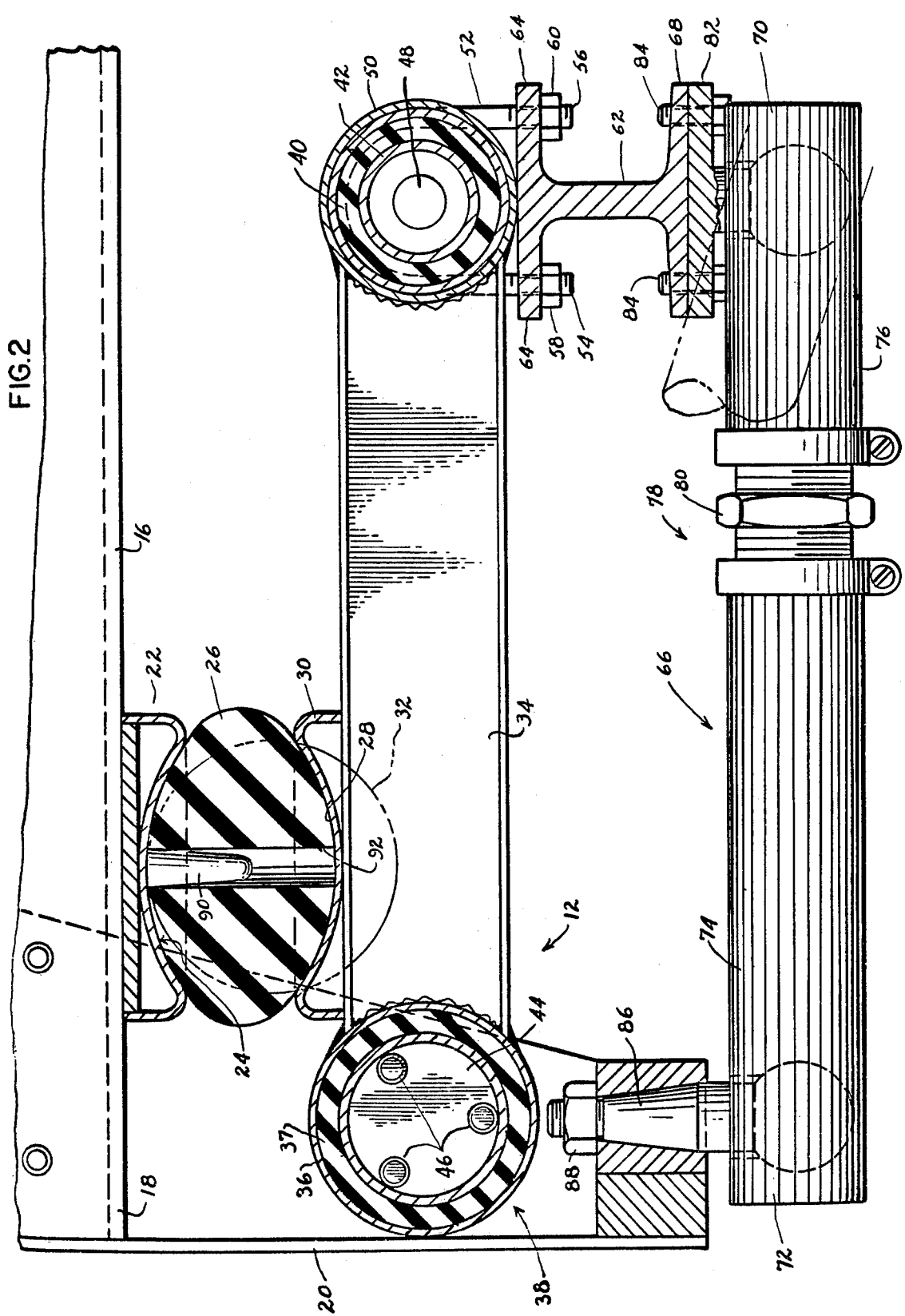
FIG. 2 is an enlarged, fragmentary, sectional, elevational view illustrating the front axle suspension structure shown in FIG. 1.

An upper spring seat (see FIG. 2) 22 is secured, such as by welding, to bottom surfaces of frame 16 and is formed with a concave or cupped-shaped surface 24 against which upper surfaces of a spherical elastomer 26 come to bear. Bottom surfaces of spherical elastomer 26 bear against concave or cupped-shaped surfaces 28 formed on a lower spring seat 30. Movement of upper and lower spring seats 22 and 30, respectively, will cause spherical elastomer 26 to be compressed or deformed under pressure, thereby assuming the configuration under load shown in full lines in FIG. 2. The phantom outline 32 of FIG. 2 illustrates the unloaded or relaxed configuration and shape of elastomer 26 under no load at all.

It is to be noted here that while a spherical cross section has been illustrated for elastomer 26 as a preferred configuration, it is well within the scope of the present invention to provide other than spherical shapes which will nonetheless provide a varying or increasing spring rate under progressively increasing load conditions. It is yet further contemplated by my invention to substitute a volute spring or a conical helical spring for the elastomeric members already described.

Lower spring seat 30 is secured, such as by welding, to a longitudinally extending beam member or arm 34. Beam member 34 is trunnioned at its forward end through an outer collar or sleeve 36 of a bearing assembly 38 to which the beam member is welded. Bearing assembly 38 includes said outer collar 36 within which a low friction elastomeric liner 40 is coaxially disposed, encircling an inner sleeve 42 which, itself, has both of its ends closed by plug members 44 welded thereto. Plug members 44 are each formed with tapped holes to accept threaded bolts or fasteners 46 which secure same endwise to depending bracket 20. The front trunnion may optionally comprise a tube extending entirely across the vehicle frame and bracketed to said frame.

Beam member 34 is secured to front steering axle 48 of truck 10 at its rearward end by means of a pivoted connection. Beam member 34 is clamped to nonsteering axle 50. Beam member 34 is clamped to nonsteering axle 50 by means of a generally U-shaped clamp 52 threaded at its ends 54 and 56 to receive nuts 58 and 60, respectively. The connection at reference numeral 50 comprises a pivoted or ball end bearing to enable a parallelogram-type of motion in conjunction with a ball end on the torque rod situated below said steering axle. On the other hand, the rear axle of vehicle 10 is affixed to a beam which resists brake and/or drive torque forces.

Clamp 52 serves the function of removably securing non-steering axle 50 to a transversely extending I-beam 62 or other suitable structural member at its outwardly extending upper flange 64. An adjustable torque rod assembly 66, shown in FIG. 2 interconnects the lower flange 68 of steerable I-beam 62 with bracket 20 at its opposite ends 70 and 72. Torque rod assembly 66 includes two rod portions 74 and 76 which are interconnected by a turnbuckle-type of adjustment assembly 78 intermediate ends 70 and 72. Manipulation of hexagonal ringnut 80 will cause rod portions to move toward or away from one another, as desired. It is to be noted that for the convenience of the reader, torque rod assembly is shown greater than scale in the drawings.

Torque rod assembly 66 is physically interconnected with flange 68 of I-beam 62 by means of a flanged bracket 82 through which threaded fasteners or bolts 84 extend. Similarly, at the forward end 72 of torque rod assembly 66 a threaded upstanding fastener 86 interconnects end 72 of torque rod assembly 66 to depending bracket 20 and is removably secured by means of nut 88.

An optional pilot member 90 is shown secured to and depending from upper cupped shaped surface 20 into an opening 92 formed through spherical elastomer 26. While it is possible and within the scope of the present invention to provide spring seats that are able to contain and keep spherical elastomer 26 captive, I have shown pilot member 90 in FIG. 2 to illustrate yet another method of accomplishing this same result.

Thus we see in FIG. 2 a spherical elastomer 26 on which the vehicle frame 16 is supported by means of upper spring seat 22. In this embodiment of the invention the low friction trunnion is bracketed at a corner of the vehicle frame, if a steering axle is mounted thereunder, said trunnion being of adequate radial capacity to withstand the spring load reaction, plus brake torque, steering loads, and transverse steering forces. The trunnion may be mounted at the vertical center of a steered wheel spindle, with a steering rod centered at the trunnion vertical center connecting the steering knuckle to avoid steering interference with a rebound deflection. A progressively increasing spring rate, combined with a higher deflection than is feasible with conventional leaf spring suspensions affords a ready improvement in cab ride of truck 10, for example, and reduced maintenance of chassis.

Figure 3:
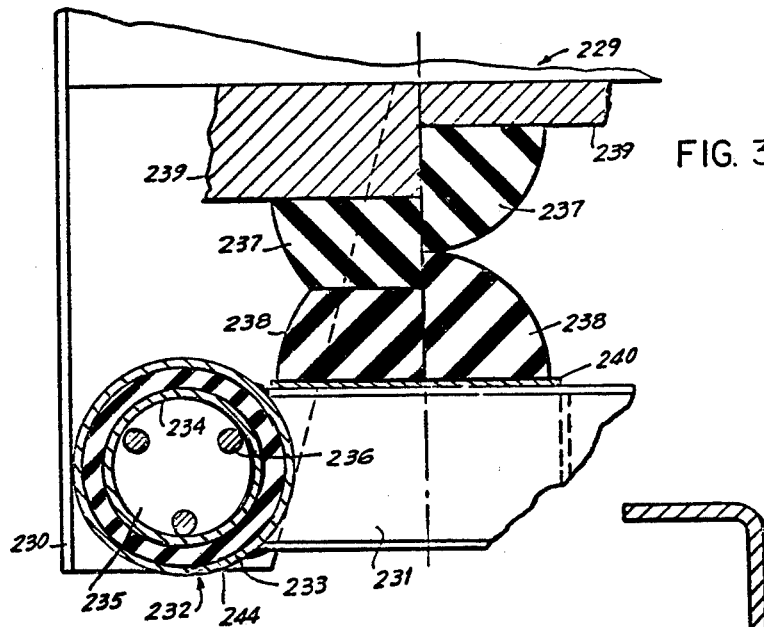
FIG. 3 is enlarged, fragmentary, sectional, elevational view of an alternate embodiment of this invention wherein two hemispherical elastomers are secured to substantially flat spring seats.

Referring now to FIG. 3 which shows a plain view of a progressively increasing spring rate suspension applied to a single axle of a vehicle, as a steering axle, or a single rear axle, a spherical elastomer or a pair of hemispherical elastomers are supported on a horizontal beam trunnioned on a large capacity low friction radial bearing to resist spring force, steering, and brake torque reactions, and transverse steering forces. The structure is especially applicable to steering axles of commercial trucks and tractors owing (1) to the practice of locating such axles as close to the extreme front of vehicle as possible, — in conformance with overall length and load distribution regulations, and, (2) demand for greater wheel stroke (or deflection) than is feasible with a semi-elliptic spring within the available space forward of a steering axle.

Figure 4:
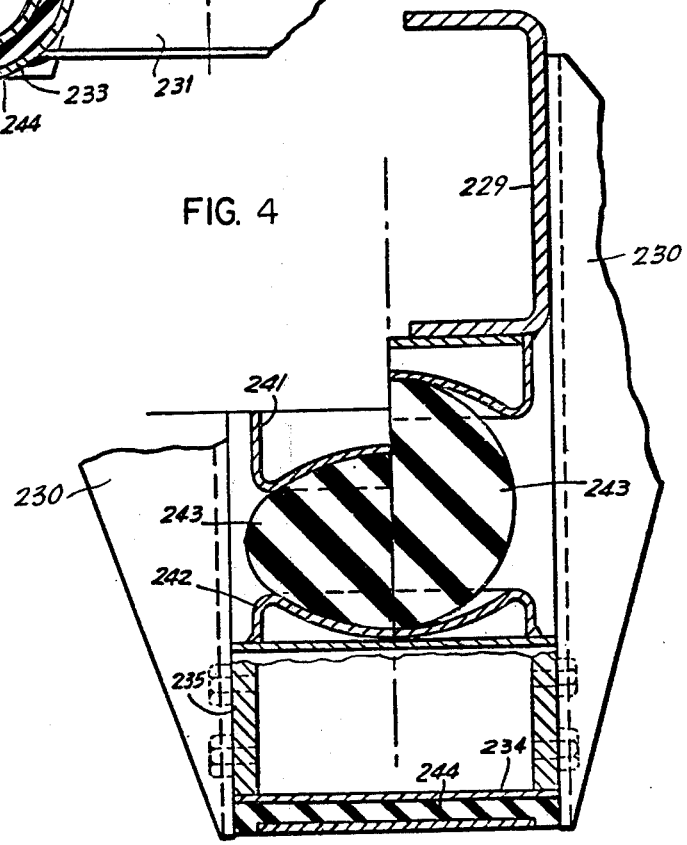
FIG. 4 is a yet another enlarged fragmentary, sectional, elevational view in which a single spherical elastomer is illustrated both in unloaded and loaded modes.

FIG. 4 shows a side elevation of the structure shown in FIG. 3, both of which views differ from a tandem axle application of spherical elastomers for a progressively increasing spring rate, in that the spring force reacts directly under the vehicle frame, without any equalization of load, thereby providing a direct (rather than one half) ratio of spring deflection to the leverage between spring and wheel stroke. With an axle located 24.5 inches aft of the front of the truck frame, with 21.5 inches between axle and trunnion and 6 inches therefrom to spring center, an elastomer of but 6 inches diameter will afford 6.46 inches of wheel stroke at 30 percent deflection of the elastome or 74 cycles per minute for a 10,000 lb. axle suspension. A single pilot member preferably in the fixed seat (at frame) is all that is required. The entire structure is simple and efficient while providing a progressively increasing spring rate with a low frequency ride.

Referring now to the various structural elements of FIGS. 3 and 4, assembly 229 is shown to include a vehicle frame 230, the forwardmost end of which is depicted. A horizontally beam which extends longitudinally with respect to the vehicle axis is shown as numeral 231, which is integral at its forward end with outer sleeve or collar 233 of bearing assembly 232, while its rearmost end is connected to the vehicle axle.

Bearing assembly 232 consists of said outer collar 233 within which a liner 244 is coaxially disposed, encircling an inner sleeve 235 having both ends closed by plug members 235 welded integral, and tapped for threaded bolts or fasteners 236 securing it to frame bracket flanges 230.

In FIG. 3, two hemispherical elastomers 236 and 238 are shown bonded at their flats to support plates 239 and 240, respectively. The result of displacements can be best seen to the left of the vertical reference line, wherein the elastomeric members 237 and 238 are deformed, exhibiting a varying and progressively increasing spring rate.

FIG. 4 illustrates an embodiment wherein a single elastomeric sphere 243 is captive between cupped supports 241 and 242. A pilot member, not shown in FIG. 4, may extend down from support 241 through an opening formed through elastomeric sphere 243 to prevent the escape of sphere 243.

It is important for the reader to note here that the scope of the present invention includes, without limitations, spring means which may exist in any one of a number of forms. For example, FIGS. 1 and 2 illustrate an embodiment of the present invention which utilizes spherical elastomers. The reader's attention is directed now to FIGS. 5 and 6 wherein conical helical spring means and volute spring means are illustrated as falling within the scope of my invention. To assist the reader of this specification in understanding the context of the terms "volute spring" and "conical helical spring," as conventionally accepted by those familiar with the vehicle suspension art, and as used herein, it is intended that the term "volute spring" shall mean and include a spirally or helically twisted form, turn or whorl of a form, the locus of points of which define a combined circular and rectilinear path. The volute spring disclosed in FIG. 6 includes a form of rectangular cross section, with the vertical sides of this rectangular cross section being longer than the horizontal parallel sides.

Figure 6:
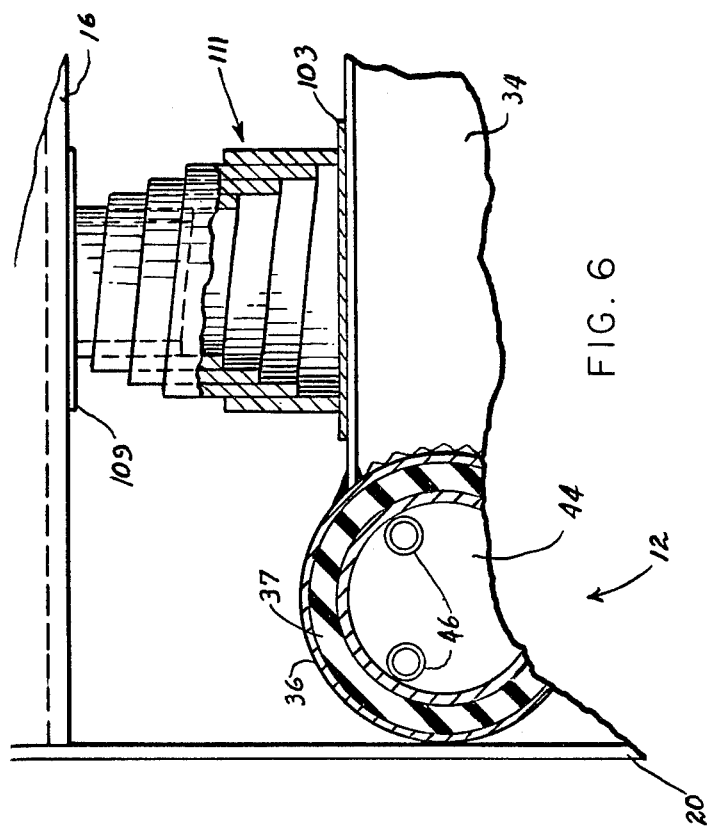
FIG. 6 is an enlarged, fragmentary, sectional, elevational view illustrating the front axle suspension structure according to the present invention in which a volute spring is employed.
Figure 5:
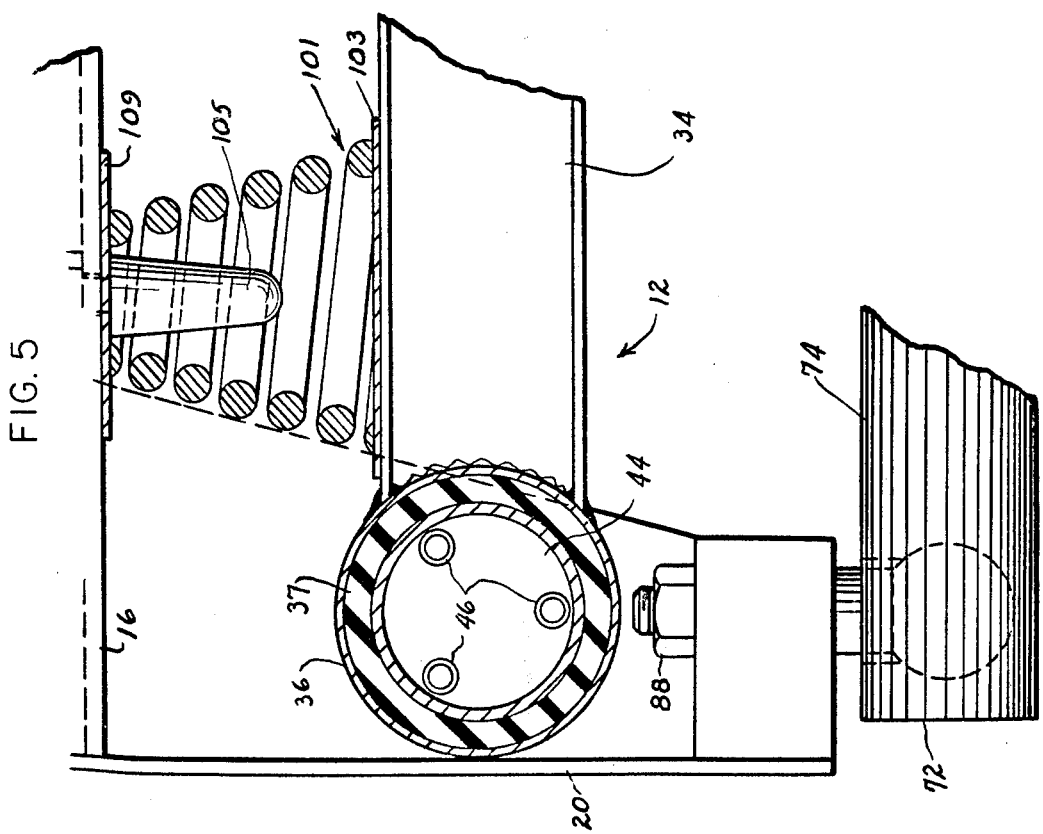
FIG. 5 is an enlarged, fragmentary, sectional, elevational view illustrating the front axle suspension structure according to the present invention in which a conical helical spring is employed.

As previously stated and suggested, the use of a volute spring affords the user of the present invention a progressively increasing spring rate. Similarly, a progressively increasing spring rate is afforded the user of this invention by providing a conical helical spring of the type illustrated in FIG. 5. A conical helical spring, as is well known, means and includes a spirally or helically twisted form, turn on whorl, the locus of points of which define a combined circular and rectilinear path. As in the case of the volute spring, a conical helical spring is shaped with a progressively decreasing diameter, as one traces its length moving upwardly, such that a truncated conical overall shape is exhibited. More specifically, the diameters of the upper ends of both the conical helical spring and the volute spring are substantially smaller than the diameters of their bases. It is this structural configuration which yields a progressively increasing spring rate, upon compression of each during a loaded condition. Referring to FIG. 5, for example, a conical helical spring 101 is illustrated disposed between upper and lower spring pads 109 and 103, respectively, with a pilot member 105 depending within the coils of spring 101. Similarly, FIG. 6 illustrates a volute spring 111 disposed between similar pads 109 and 103. The structures illustrated in both FIGS. 5 and 6 are illustrated to show the reader that the user of the present invention has available to him alternatives to the spherical elastomer 26 illustrated in FIG. 2, while yet enjoined a progressively increasing spring rate of the type described above. While it is the intention here not to burden this specification with a multiplicity of descriptions, it will suffice to state that the conical helical spring 101 and the volute spring 111 illustrated in FIGS. 5 and 6 are supported within front axle assembly 12 between frame 16 and beam member 34. In the case of conical helical spring 101, this spring is supported between upper and lower spring seats 109 and 103, respectively. Similarly, volute spring 111 is shown in FIG. 6 to be supported between these same type of spring seats. In the case of conical helical spring 101, a pilot member 105, secured by means of nut 107, maintains conical helical spring 101 at its proper functional location. This is not necessary in the case of volute spring 111.

As for the remaining structure not illustrated or only partially illustrated within FIGS. 5 and 6, the description already given above for FIG. 2 is incorporated by reference herein as if fully set forth. It is to be noted here that, whatever the user's preference, whether it be the conical helical spring or the volute spring, the novel progressively increasing spring rate will be realized according to this invention.

The present invention has been described in sufficient detail to enable one of ordinary skill in the art to make and use same. Obviously, modifications and alterations of the aforedescribed preferred embodiments of my invention will occur to others upon a reading and understanding of the specification and drawings, and it is my intention to include all such modifications and alterations as part of my invention, insofar as they come within the proper scope and spirit of the invention as defined by the appended claims.

What is claimed is:

1. A vehicle axle suspension system operatively providing a progressively increasing spring rate, comprising in combination, a vehicle frame structure, a support bracket depending from and secured to said vehicle frame structure, a support trunnion assembly secured to said support bracket, a load-bearing vehicle axle disposed below said frame structure, a suspension beam member cooperatively interconnecting said trunnion assembly and said vehicle axle at first and second ends thereof, respectively, a lower spring seat integral with an disposed upon said beam member intermediate said trunnion assembly and said vehicle axle, a cooperating upper spring seat secured to and supporting said vehicle frame, and a compressively resilient load-deflectible spring member disposed in contact with and interconnecting said lower and said cooperating upper spring seats, said spring member being operatively compressed between said spring seats under load, and said vehicle axle being disposed vertically between said second end portion and a torque rod hingedly interconnected to both said support bracket and said vehicle axle.

2. A vehicle axle suspension system according to claim 1, wherein said spring member comprises a substantially spherical elastomer.

3. A vehicle axle suspension system according to claim 1, wherein said spring member comprises a conical helical spring.

4. A vehicle axle suspension system according to claim 1, wherein said spring member comprises a volute spring.

5. A vehicle axle suspension system according to claim 1, wherein said spring member is removably secured to one of said spring seats.

6. A vehicle axle suspension system according to claim 1, wherein said suspension beam member is fixedly connected to the underside of said vehicle axle.

7. A vehicle suspension system according to claim 1, wherein said torque rod is adapted to preserve the vertical alignment of said vehicle axle during operational deflection of said vehicle axle suspension system, said torque rod being disposed vertically below said vehicle axle and hinge centers of said suspension beam member during operation thereof.

8. A vehicle suspension system according to claim 2, wherein said spring seats comprise generally cupped-shaped disked forms, said system further including a tapered pilot member extending from at least one of said spring seats, said elastomer is adapted to be compressively deformed and is formed with a cavity therein for cooperatively receiving said pilot member.

9. A vehicle axle suspension system according to claim 1, wherein said trunnion assembly includes a low friction liner disposed between inner and outer sleeve members.

10. A vehicle axle suspension system according to claim 1, wherein said lower spring seat is disposed nearer said trunnion assembly than said vehicle axle.

11. A vehicle axle suspension system operatively providing a progressively increasing spring rate, comprising in combination, a vehicle frame structure, a support bracket depending from and secured to said vehicle frame structure, a support trunnion assembly secured to said support bracket, a load-bearing vehicle axle disposed below said frame structure, a suspension beam member cooperatively interconnecting said trunnion assembly and said vehicle axle at first and second ends thereof, respectively, a lower spring seat integral with and disposed upon said beam member intermediate said trunnion assembly and said vehicle axle, a cooperating upper spring seat secured to and supporting said vehicle frame, and a compressively resilient load-deflectible spring member disposed in contact with and interconnecting said lower and said cooperating upper spring seats, said spring member being operatively compressed between said spring seats under load, and said vehicle axle being disposed vertically between said suspension beam second end portion and said vehicle frame structure, said suspension beam functioning as a torque rod through its interconnection to both said support bracket and said vehicle axle.

* * * * *